United States Patent [19]

Thedieck

[11] Patent Number: 4,995,537
[45] Date of Patent: Feb. 26, 1991

[54] REMOVABLE GUN RACK

[76] Inventor: T. Mark Thedieck, 203 E. Monroe St., Thomasville, Ga. 31799

[21] Appl. No.: 452,416
[22] Filed: Dec. 19, 1989
[51] Int. Cl.⁵ .............................................. B60R 7/14
[52] U.S. Cl. ..................................... 224/273; 211/64; 224/318; 224/42.46 R
[58] Field of Search ............... 224/273, 275, 311, 314, 224/318, 324, 42.46 R, 42.46 B, 913; 211/64; 296/37.6, 37.13, 37.16

[56] References Cited

U.S. PATENT DOCUMENTS 1,853,261 4/1932 Dawson ............................ 224/311
2,577,713 12/1951 Nogle ................................. 211/64
2,919,058 12/1959 Thompson ........................ 211/64
4,682,720 7/1987 Lucas ................................ 224/311

FOREIGN PATENT DOCUMENTS 1953620 5/1971 Fed. Rep. of Germany ...... 224/318

Primary Examiner—Renee S. Luebke
Attorney, Agent, or Firm—Brady, O'Boyle & Gates

[57] ABSTRACT

A removable gun rack detachably mounted within a vehicle including an extensible belt connected at either end to the frame of the vehicle above the vehicle floor. Loops are provided in the belt for receiving the barrel while the vehicle floor supports the gun stock.

4 Claims, 1 Drawing Sheet

REMOVABLE GUN RACK

BACKGROUND OF THE INVENTION

Various gun racks have been proposed for motor vehicles. The most recognized gun rack is the frame type fixedly mounted in the vicinity of the rear window of the cab of a pick-up truck. Other portable or removable type gun racks have been proposed for mounting on the back of the front seat of a motor vehicle, as disclosed in U.S. Pat. Nos. 2,797,033 and 3,167,182.

While these types of gun racks have been satisfactory for their intended purpose, they have been characterized as requiring a duplicity of parts for carrying the guns in a horizontal position behind the back of the front seat of the motor vehicle, and because of the many parts, the rack is not easily storable when removed from the seat back. Furthermore, the gun racks as disclosed in the above-mentioned patents are constructed and arranged for mounting in a vehicle wherein the back of the front seat extends completely across the width of the vehicle; thus, they are not readily adapted for use in today's vehicles wherein the front seat consists of a pair of "bucket" seats.

After considerable research and experimentation, the removable gun rack of the present invention has been devised for use in vehicles having front "bucket" seats, and comprises, essentially, an adjustable length belt extending transversely of the vehicle behind the front "bucket" seats and connected to the frame of the vehicle on each side thereof above the floor of the vehicle. The belt is provided with a plurality of loops for receiving the barrel of each gun to be carried, while the stock of each gun rests on the floor of the vehicle, whereby the guns are transported in a substantially vertical position.

When not in use, the belt is detached from the vehicle frame and folded for storage in a relatively small space.

DESCRIPTION OF THE PREFERRED EMBODIMENT

Figure 1:
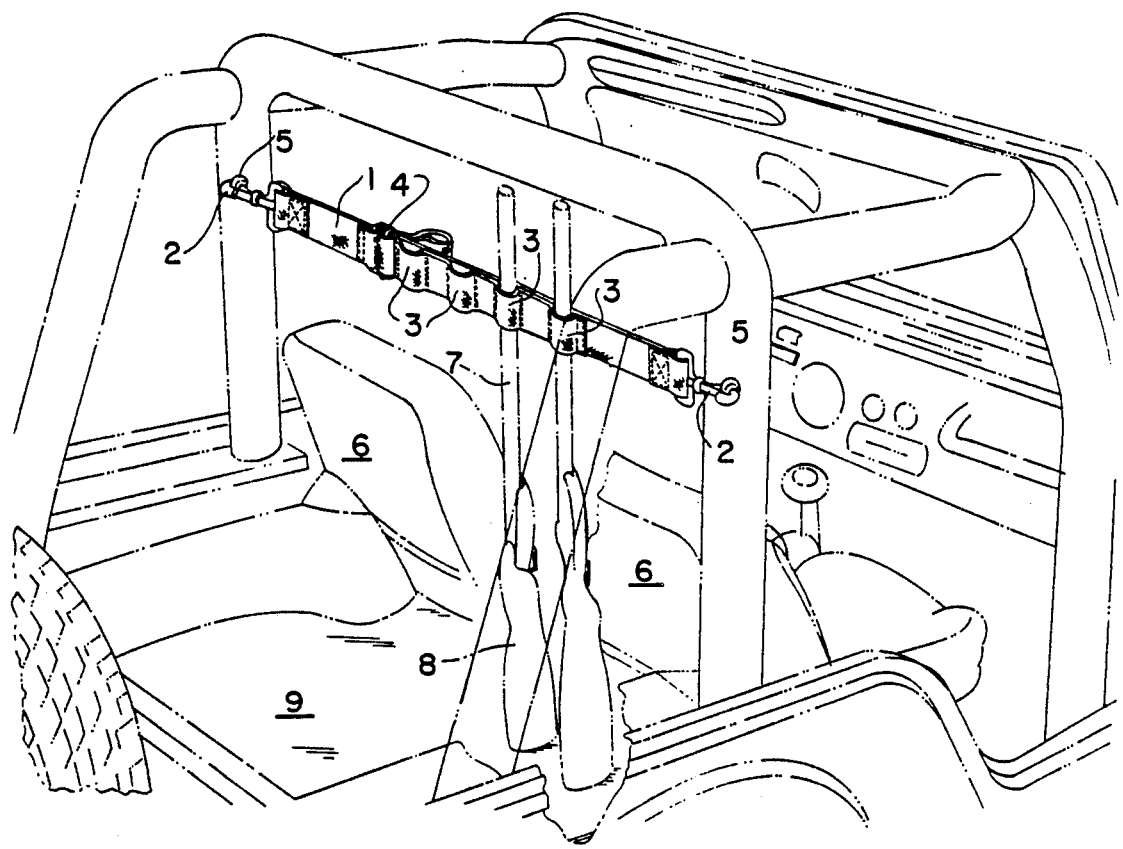
FIG. 1 is a perspective view of the gun rack of the present invention mounted in operative position on a vehicle.
Figure 2:
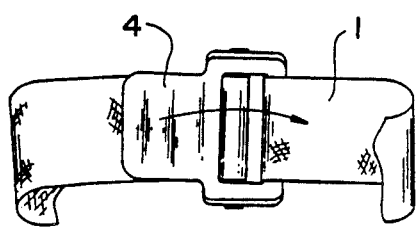
FIGS. 2 and 3 are fragmentary, elevational views showing the manipulation of the belt tightening buckle for adjusting the length of the gun rack.
Figure 3:
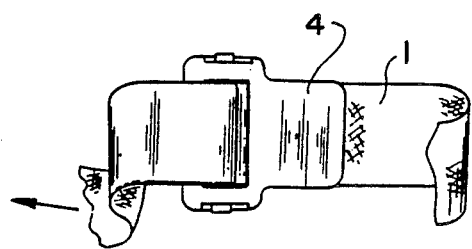

Referring to the drawing and more particularly to FIG. 1, the gun rack of the present invention comprises a flexible web belt 1 having snap hooks 2 on each end thereof, and a plurality of fixed loops 3, and a belt tightening buckle 4 interposed the ends of the belt 1.

For purposes of illustration, the belt snap hooks 2 are shown connected to eye bolts 5 secured to the vehicle frame or roll bar 6. In other vehicles, such as the Jeep Wrangler, eye bolts are not needed and the ends of the belt 1 can be simply wrapped around the roll bar and secured to itself above and in proximity to the conventional seat belt connection on the roll bar.

In use, the length of the belt 1 is adjusted to the width of the vehicle to which it is to be attached by manipulating the buckle 4 and pulling the sections of the belt to attain the desired length. The ends of the belt 1 are then secured to the frame of the vehicle behind the front seats 6 of the vehicle. The barrel 7 of each gun to be carried is inserted into a respective loop 3 and the gun stock 8 is positioned to rest on the vehicle floor 9, whereby the guns are transported in a substantially vertical position.

When not in use, the belt can be detached from the vehicle frame and folded up into a small package and stored in a relatively small space.

From the above description, it will be appreciated by those skilled in the art that the construction and arrangement of the gun rack of the present invention wherein the guns are transported vertically rather than horizontally only one component is required to support the gun barrel, while the vehicle floor is employed for supporting the gun stock. Furthermore, by connecting the ends of the belt to the vehicle frame rather than to the rear of the front seat, the gun rack can be used not only in vehicles wherein the front seat consists of a pair of "bucket" seats but also in vehicles wherein the front seat extends continuously across the vehicle.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A removable gun rack detachably mounted within a vehicle, comprising a belt extending transversely across the interior of the vehicle, first means connected to the belt intermediate the ends thereof for adjusting the length of the belt, to thereby facilitate the fitting of the gun rack to vehicles of various widths, second means connected to each end of said belt for detachably connecting each end of the belt to the vehicle frame above the vehicle floor, a plurality of fixed loops provided in said belt intermediate the ends thereof, and a gun, the barrel of said gun being insertable into a selected loop and the stock of said gun resting on the vehicle floor, whereby a plurality of guns may be transported in a substantially vertical position.

2. A removable gun rack according to claim 1, wherein the means for detachably connecting each end of the belt to the vehicle frame comprises a snap hook mounted on each end of said belt, and an eye bolt secured to the frame of the vehicle on each side thereof, said snap hooks being connected to said eye bolts.

3. A removable gun rack according to claim 1, wherein the belt is mounted within the vehicle behind the front seat.

4. A removable gun rack according to claim 1, wherein the belt is made of flexible web material, whereby when not in use the belt can be folded into a small package and stored in a relatively small space.

* * * * *